United States Patent
Jerijian et al.

(10) Patent No.: US 7,079,642 B2
(45) Date of Patent: Jul. 18, 2006

(54) METHOD FOR REDUCED PROCESSING AND IMPROVED REMOTE MONITORING OF CALL CENTER ACTIVITIES

(75) Inventors: Arthur Jerijian, Houston, TX (US); Juhwan Kim, Houston, TX (US)

(73) Assignee: Stratasoft, Inc., Houston, TX (US)

( * ) Notice: Subject to any disclaimer, the term of this patent is extended or adjusted under 35 U.S.C. 154(b) by 148 days.

(21) Appl. No.: 10/766,737

(22) Filed: Jan. 28, 2004

(65) Prior Publication Data
US 2005/0163305 A1 Jul. 28, 2005

(51) Int. Cl.
*H04M 3/00* (2006.01)

(52) U.S. Cl. .................. 379/265.06; 379/265.03; 379/265.09

(58) Field of Classification Search ........... 379/265.02, 379/265.03, 265.06, 265.09
See application file for complete search history.

(56) References Cited

U.S. PATENT DOCUMENTS

| | | | |
|---|---|---|---|
| 6,058,163 A | 5/2000 | Pattison et al. | |
| 6,349,137 B1 | 2/2002 | Hunt et al. | |
| 6,408,064 B1 | 6/2002 | Fedorov et al. | |
| 6,490,350 B1 * | 12/2002 | McDuff et al. | 379/265.06 |
| 6,510,220 B1 | 1/2003 | Beckett et al. | |
| 6,542,602 B1 | 4/2003 | Elazar | |
| 6,603,854 B1 | 8/2003 | Judkins et al. | |
| 6,707,904 B1 * | 3/2004 | Judkins et al. | 379/265.06 |
| 6,711,253 B1 * | 3/2004 | Prabhaker | 379/265.01 |
| 6,711,254 B1 * | 3/2004 | Sato et al. | 379/265.02 |
| 6,741,697 B1 * | 5/2004 | Benson et al. | 379/265.02 |
| 2001/0043697 A1 | 11/2001 | Cox et al. | |
| 2002/0175929 A1 | 11/2002 | Hunt et al. | |
| 2003/0147522 A1 | 8/2003 | Elazar | |
| 2003/0169856 A1 | 9/2003 | Elazar et al. | |

* cited by examiner

*Primary Examiner*—Bing Q. Bui
(74) *Attorney, Agent, or Firm*—Parks & Associates PC

(57) ABSTRACT

A method for recording and/or simultaneously monitoring voice and screen activities of a computer work station screen from another computer and reducing the processing load on the computers. Further it provides a method to score and rate an agent using the computer work station while simultaneously monitoring the voice and screen activities of the agent on his computer work station. In another embodiment it provides a method for only updating the portions of the agent's computer work station screen which are changed on the other computer being used to moniter without updating the areas not changed.

11 Claims, 5 Drawing Sheets

METHOD FOR REDUCED PROCESSING AND IMPROVED REMOTE MONITORING OF CALL CENTER ACTIVITIES

FIELD OF INVENTION

This invention is related to methods and systems for simultaneously monitoring voice and screen activities of one computer workstation and screen from another computer and screen over a network. The monitoring can be either simultaneous with the events or recorded and played back and it may also be either screen only or voice only or both simultaneously. This invention in one of its embodiments provides reduced processing loads on the computers practicing this invention by updating to the computer being used to monitor the other computer only the portions of the screen which are changed on the computer being monitored without updating the areas not changed.

BACKGROUND OF THE INVENTION

The present invention may be useful in any situation where there is a desire to monitor the phone and computer use of one computer station with voice capabilities or just the voice/phone or just the computer and computer monitor from another computer station. In the case of business applications, this invention may be used in the business services activities of telephone surveys, credit cards agents or representative activities, technical support functions, and any other agent services business which might use telephones and related computers to conduct business over the phone. The employees who use such a system are generally referred to as agents and they are provided with computer workstations which are voice capable, by way example phones and computers which are functionally tied together, and connected to a network which is interconnected to a server computer and other computer workstations which are voice capable. These agent are generally in a group which may or may not be physically located together, but in either event there will be a group of a few to hundreds of agents. In these cases the agents interface with a "customer" over the phone and use the computers and monitors at their workstations to provide, receive and enter or discuss information related to the company's customers.

As part of this interactive business process, companies want to provide means of monitoring the activities of the agents at their computer workstations and the telephones that would give a complete picture of the agent's performance and interaction with the customer. Further, a company may need a complete picture of the agent's performance to be used as a teaching tool for increasing the efficiency of the agent and obtaining a better result for the company. Also, a company may want to protect itself and the agent from a customer's false claim. In order to monitor these agents, companies set up supervisors with another computer with voice capabilities which may be tied into the network for connection to the agents computer workstation and telephone. As the number of agents and computer workstations grow, the ability to monitor each agent becomes more difficult in both time available for the supervisor and the computing load required to bring the screen changes from the agent's computer screen or monitor to the supervisor's computer and monitor in real time. As the supervisor's time get short with the increase of the agents being monitored, it becomes more difficult to evaluate an agent and create an overall evaluation of a particular agent that is consistent with the preselected categories or criteria that a company may choose for its evaluation of the agents.

The prior art telephone call monitoring systems tied to computer systems have tried various means to achieve successful results with limited success. Some of the prior art systems have used triggers or business events to activate recording functions of the voice and computer activity or connect a supervisor by voice or by voice and a simultaneous screen copy display of the agents screen and his activity. In some prior art systems, they have used random time checks to monitor agents screens and voice communications. In others, they have used special times of the day or intervals of time to periodically check agents and see how they were doing. Still others have used voice sensors which track the speed and volume of an agent's or customer's voice to trigger event monitoring because these events might indicate a problem with an agent or customer. However, in all this type prior art, if the volume of activity increased the processing and storage load also increased, the supervisor could not follow all the activities. This slow down on the computer systems therefore was too much activity and the supervisor lost the ability to follow in real time. In many of these cases, the prior art had to further employ a recording system and then analyze the recorded event at a later time. Reviewing the recorded event at a later time results in a loss of efficiency and is time consuming.

To solve the computational loading problems, some of the prior art attempted to compare the screens of the agent's computer workstation monitor after taking an initial "shot" of the screen and then doing a screen comparison to the first screen shot to determine the changes and if changes occurred the full screen was delivered to the supervisor's computer and monitor to allow him to follow the activity of the agent on his screen. While such a prior art approach may have worked for one agent and one supervisor, such a system becomes overloaded with computational workload that it is difficult to keep up in real time when there are many agents and supervisors. The constant comparing of full screens, looking for changes and then sending the full screen with the change can quickly overload the system and degrade the ability for the agents computer workstation to be kept simultaneously current on the supervisor's computer monitor. As time delayed responses begin to occur, the supervisor is unable to keep up with the live activity. Even when the system comprises only one agent and one supervisor, the delay time could be significant if there was a lot of activity at the computer workstations and monitor of the agent.

Other prior art attempted to provide simultaneous monitoring of computer workstations with the supervisor's computer and monitor by trying to broadly define the screen changes by monitoring broad screen change regions in which only part of the region changed. This concept sought to reduce the amount of data requiring comparison and determined to be different and in need of transmission and therefore would reduce the computational load on the computer systems. One piece of prior art attempted to reduce the amount of screen data to be transmitted by the use of a pair of coordinates that grow to encompass all the changed regions between pollings from the monitored computer to the updated computer screen of the supervisor computer and monitor. This prior art system even used a storage and comparison function between polling for the screen changes to reduce the load on the system; however it still transferred too much data to the monitoring computer from the agents monitored computer. This prior art used intercepts of graphic primitive functions to the display driver to determine if regions changed and expanding the coordinate pairs to encompass those regions. Further, this prior art used the graphic primitives which were passed to the display driver and missed or left out system messages which were passed to window registered with the operating system, thereby leaving some activity of the agents at their computer workstations not able to be transmitted to the supervisor's computer and monitor for monitoring.

The prior art used many approaches to tie the voice and computer screen or monitor change together. It attempted to record the voice and index it to video or digital recording of the events on the agents computer and monitor and allow play back. The problem with that is that play back functionality requires additional time and does not allow a supervisor to intervene at the time of the activity and prevents simultaneous evaluation of the agent in real time or near the occurrence of the events.

Much of the prior art provide means, which while inefficient to record and monitor the agents computer workstation, did not provide for evaluation of the agent on the supervisor's computer and computer monitor. This failure prevented evaluation and rating of the agents simultaneously with the activities upon which they were being rated. In some of the prior art, the supervisor would have to review a recorded phone and computer screen version and then rate the agents for the company based on the predetermined criteria. This was not very efficient.

OBJECTS OF THE INVENTION

It is the object of this invention to overcome the deficiencies and short comings of the prior art and provide a method and system which provides rapid and simplified remote monitoring of both voice and screen activity of a computer workstation, which provides updating of another computer screen with the regions changed in rapid and simple updating formats, and which allows the voice and data to be monitored in real time and/or be recorded.

It is also an object of this invention to eliminate the need for transmission of the full screen images of agent's computer workstation screen to the supervisor's computer workstation screen and monitor each time the agent's screen changes. This reduction in full screen to full screen transmissions reduces the computational load on the computer systems.

A further object of this invention is the eliminating the need for using coordinates which encompass all the changed regions within those coordinates, so that there is reduced transmission of graphics within the regions which did not change.

Yet a further object of this invention is to eliminate computer loading by the processing of coordinates before a call is made to obtain the graphics for the areas defined in the processed coordinates. This improvement by this invention eliminates multiple transmissions of the graphics from the agent's screen to the supervisor screen and can greatly reduce the computational activity of the systems, which is specially important when multiple agents are monitored simultaneously.

It is a further object of this invention to use one call to obtain the graphics after resolution of the coordinates which are to be inserted within the resolved coordinates and thereby reduce the areas which did not change from being sent and sending multiple calls.

Also an object of this invention is to provide simultaneous screen monitoring and simultaneous screen voice monitoring in real time as the events are occurring such that a supervisor may be able to view the changes on the agent's screen as well as listen to the voice communication between the agent and the customer.

A still a further object of this invention is to provide the ability to both observe and record the screen activity and voice communications as they are occurring at the agent's station on the supervisor's station, while functionally allowing recordation for playback at a future time. The recording therefore allows the historical record of the events to be used for protection of the company, for training purposes of the agents, and for any other purpose for which a recorded copy of the live transaction would be of value.

Still a further object of this invention is to provide a means for allowing the supervisor at his computer terminal to record and score the agent based on predetermined criteria. This predetermined criteria is displayed on the screen of the supervisor while the events on the agent's screen are being displayed on the supervisor's screen along with the voice activity being monitored in real time as these events occur. This allows the supervisor to rate and evaluate the agent while the events are simultaneously happening, which provides for a more accurate evaluation of the agent.

Yet another object of this invention is to obtain rectangular screen coordinates in changed windows on an agent's screen and storing them in a queue for access at predetermine time sequences and processing prior to sending any call for window graphics within those coordinates.

Also, an object of this invention is to process the rectangular screen coordinates of changed windows on an agent's screen for overlapped rectangular screen coordinated and to create new rectangular screen coordinates from said overlapped rectangular screen coordinates changed in a window and, for any portion of the rectangular screen coordinates changed but not overlapped, creating smaller rectangular screen coordinates, until operating these steps there are no overlapping screen coordinates, and then sending one call for graphics for each new rectangular screen coordinates, which thereby reduces the amount of graphics called and sent to another computer screen, such as a supervisor's monitor.

Still a further object of this invention is to obtain command prompt rectangular command coordinates changed from a command message received by the operating system on an agent's computer workstation, which would not show up as rectangular screen coordinates on a agent's workstation screen to allow another computer workstation and monitor to track command changes as they occur.

A further object of this invention is to allow another computer station and monitor to track multiple workstation computers and screens at one time for visual activity on all the station and then dial into the voice communication of one of such workstations and screens to listen into the voice conversation being carried on at the workstation. If that dialed workstation and the conversation of the agent and the customer are of interest to a supervisor, the supervisor may activate a recording of the screen activity and the voice activity for later use.

A still further object of this invention is to provide for the voice and data to travel over the same circuits in the form of voice data packets or to allow analog transmission depending on the systems being used and its capacities.

Other objects, features, advantages, and applications of the present intention will become apparent upon reading the following detailed description of the preferred embodiment of the invention when viewed in conjunction with the drawings and the appended claims, even though reference is made to the invention's use in a call center environment.

BRIEF DESCRIPTION OF THE DRAWINGS

These and other features, objects, advantages and applications of the present invention will become more readily apparent from the following detailed description, which should be read in the broadest context with the accompanying drawings, which are listed as follows.

DETAILED DESCRIPTION OF A PREFERRED EMBODIMENT

The following embodiments are described by way of a call center application, which could be used for many such applications in various types of call centers, but this invention is not limited to call centers only, but to all such applications where the monitoring of one computer is desired by someone with another computer either with active voice capabilities or inactive voice capabilities. Those skilled in this art will recognize and understand that these disclosed methods and systems could be readily adaptable for broader applications without departing from the concept of this invention.

In the simplest form, one of the preferred embodiments of this invention would have at least one agent workstation with voice capabilities, and it would be connected to a network which has an automatic call distribution (ACD) System and at least another computer with voice capabilities also connected to this system. Each of the above referenced computers would have and be running its own operating system and would be connected to a computer server or a network. All of these computers would be running a shared library, such as Active X, loaded into memory. The at least one agent workstation would have an agent stationed at it and a supervisor would stationed at the at least another computer. For the sake of describing this invention, the agent would be active on the phone and the computer workstation and the supervisor would have his computer active.

Figure 1:
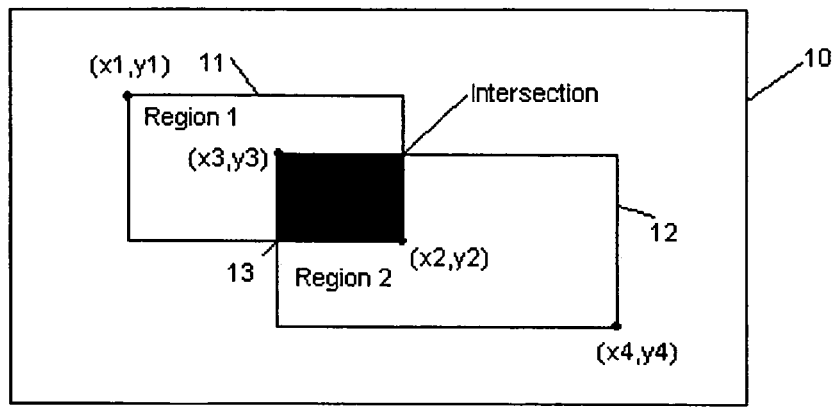
FIG. 1 is a diagrammatic hypothetical representation of two rectangular screen coordinates which have changed in a window and are in overlap relationship on an agent's computer screen monitor and would be the result of his activity on his computer workstation.
Figure 2:
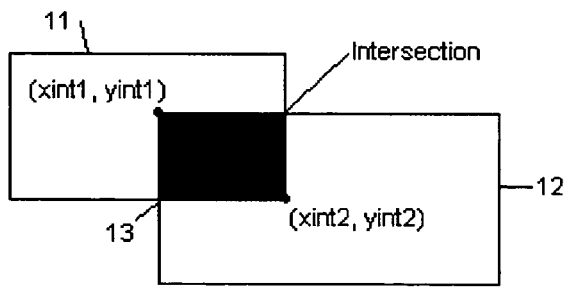
FIG. 2 is a diagrammatic representation of the two rectangular screen coordinates in FIG. 1 where in a preliminary analysis the overlap relationship is shown and the overlap relationship is defined in preliminary new rectangular coordinates.

It would be understood by those skilled in the art that complete screen changes on the agent's workstation would be transferred to the supervisor's computer monitor, but much of the activity in these environments are just small changes on the agent's workstation monitor. Therefore, it is desirable to only transmit the small changes as they are made and not have to transmit the whole screen each time a change occurs. To better understand this preferred embodiment, refer now to FIG. 1 for a simplified step of one preferred embodiment which occurs in response to an agent's action on his computer. The agent's screen is generally referred to at 10 has recorded a $1^{st}$ event 11, which would generate rectangular screen coordinates (x1, y1) and (x2,y2) which define a box, and recorded a $2^{nd}$ event 12, which would generate rectangular screen coordinates (x3,y3) and (x4,y4) which define a box. These two actions of the agent have thus created a pair of rectangular boxes on his screen in overlapped relationship and have resulted in rectangular screen coordinates which are in overlapped relationship, as shown in FIG. 1, defined by the darkened area 13 and have intersects along their coordinates. These intersects would define darkened area 13, as shown in FIG. 2, by coordinates (xint1, yint1) and (xint2,yint2). Those skilled in the art will appreciate that from these two events which created the overlapped areas 13 on agent's screen 10, that these overlapped areas 13 would require two full screen changes to capture the agent's activity. However by the practice of this invention with its resolution of the rectangular screen coordinates, it will eliminate the need for two full screen changes caused by the overlapped area 13, as will be herein after explained.

Figure 3:
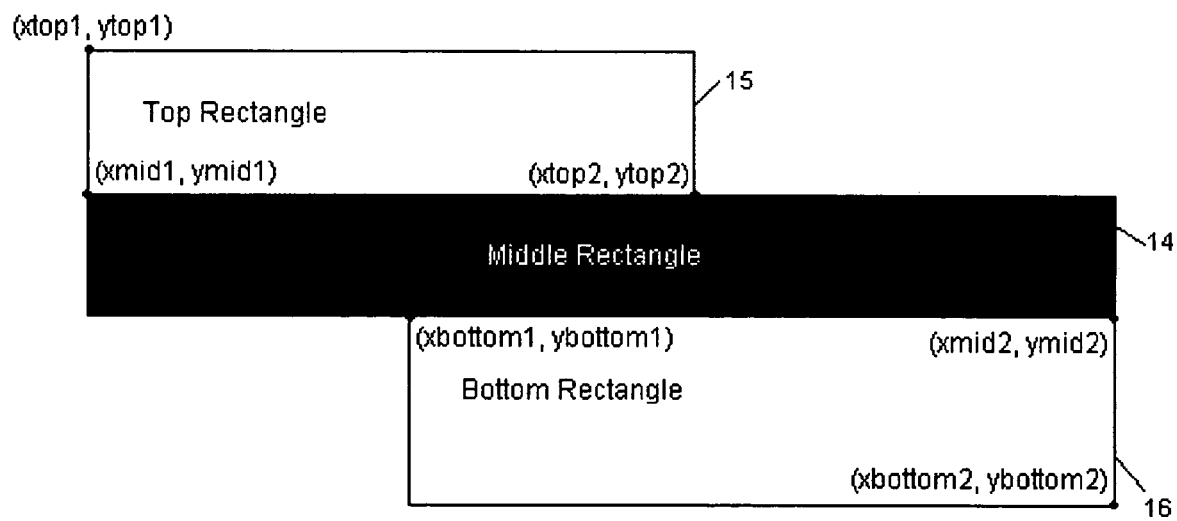
FIG. 3 is a diagrammatic representation of the final new rectangular screen coordinates extracted from FIG. 2 to resolve the original two rectangular screen coordinates which were overlapped into three rectangular screen coordinates where none are overlapped.

The overlapped area 13 will have its coordinates processed, as will later be explained herein, to create a full set of rectangular screen coordinates defined as middle box 14, as shown in FIG. 3, which would have rectangular screen coordinates (xmid1,ymid1) and (xmid2, ymid2), a top box 15 with rectangular screen coordinates (xtop1, ytop1), and a bottom box 16 with rectangular screen coordinates (xbottom1, ybottom1), and (xbottom2, ybottom2), which is best seen in FIG. 3. Once this processing has occurred, the result of the rectangular screen coordinates is that there are now no overlapping rectangular screen coordinates and the rectangular screen coordinates are ready for using one call to obtain window graphics for display to another computer. Thus, as those skilled in the art will appreciate, only those substantially changed regions will be transmitted for a graphic call and there will be a great reduction in computational demand on the computers using such a system for updating of an agent's screen to another computer screen, such as a supervisor's screen.

Figure 4:
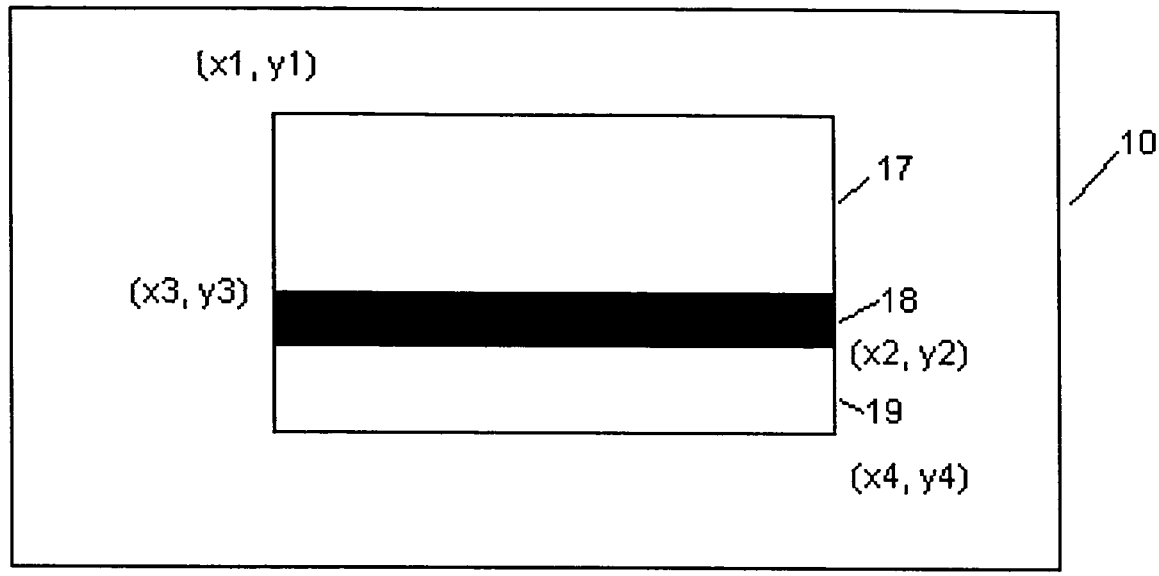
FIG. 4 is another diagrammatic hypothetical representation of two rectangular screen coordinates which have changed in a window and are in overlap relationship on an agent's computer screen monitor and would be the result of his activity on his computer workstation, but they represent a different overlapped condition of a complete overlap of the two rectangular screen coordinates.
Figure 5:
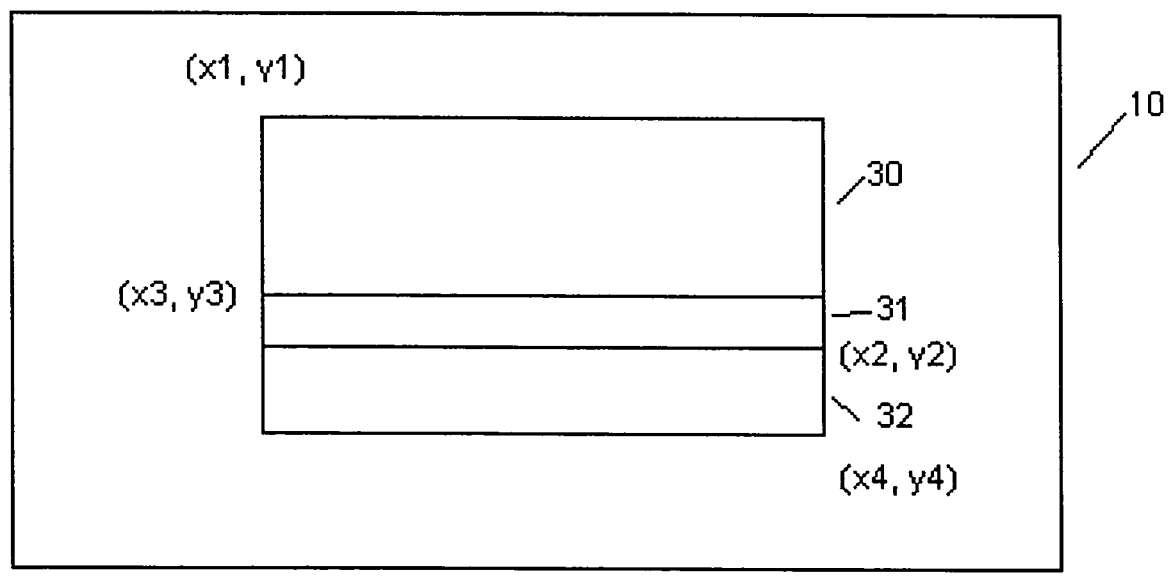
FIG. 5 is a diagrammatic representation of the final new rectangular screen coordinates extracted from FIG. 4 to resolve the original two rectangular screen coordinates which were overlapped into three rectangular screen coordinates which are then put in a queue to capture new screen graphics for the three new rectangular screen coordinates.

Referring to FIG. 4 for another simple step of a preferred embodiment of this invention, in response to an agent's action on his computer, the agent's screen has recorded a $3^{rd}$ event 17, which would have resulting rectangular screen coordinates which would place them, as shown in FIG. 4, defined by the $2^{nd}$ darkened area 19 and have only common coordinates along their common boundaries. These common boundaries being coordinates (x3,y3) and (x2,y2). The overlapped region 18 will have its coordinates processed, as will later be explained herein, to create a full set of rectangular screen coordinates defined as a middle box 30, as shown in FIG. 5, which would have rectangular screen coordinates (x3,y3) and (x2,y2) and create a top box 31 and a bottom box 32 and would be resolved into rectangular screen coordinated (x1,y1) and x4,y4) as it final resolution of the screen coordinates and require only one graphic call therefore. Those skilled in the art will appreciate that from these two events which created the overlapped events on an agent's screen 10 their overlapped area 18 would require two full screen changes to capture the agent's activity. By the practice of this invention with its resolution of the rectangular screen coordinates it will eliminate the need for two full screen changes caused by the overlapped area 18, as will be herein after explained.

Figure 6:
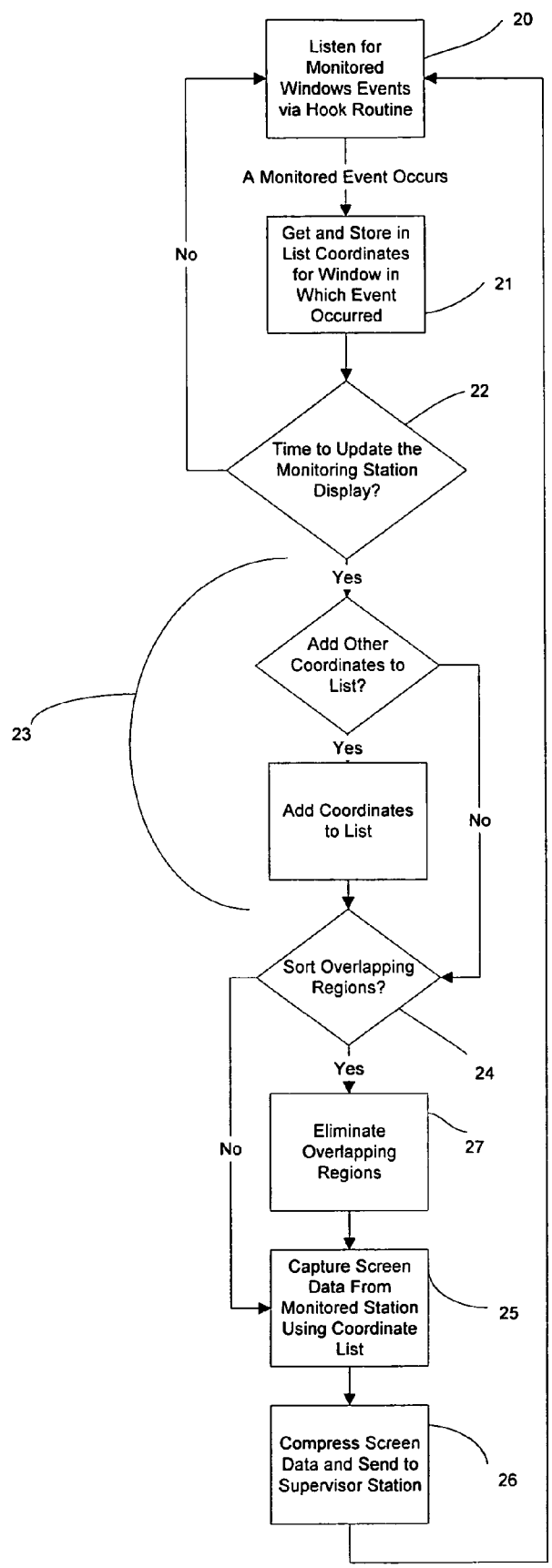
FIG. 6 represents a general diagrammatic over view of the events in the process from obtaining the first rectangular screen coordinate in a window to the sending of the final changed screen data to a supervisor's screen showing the changes on the agent's computer workstation and monitor.

Referring now to FIG. 6 for the process steps in one embodiment which utilize the simple steps set out above, the agent's computer workstation and screen are activated to run a hook routine 20 for obtaining rectangular screen coordinates as they occur by listening for monitored window events. A hook routine 20 in this embodiment can also be set to obtain rectangular screen coordinates from command prompts which are changed, and which reflect activity which would not be generated as a monitored window events. Once a rectangular screen coordinate is changed in a window or command prompt the hook routine 20' grabs it and the rectangular screen coordinates are obtained and stored as a memory process 21. This stored memory process 21 continues to store the rectangular screen coordinates as they are obtained and held in a memory queue for a time which has been predetermined, for example 250 milliseconds, until a polling event 22 occurs. When the predetermined time has elapsed, the queue in the stored memory process 21 is polled to determine the changes in the rectangular screen coordinates stored, if any. If no changes have occurred then the queue is reset for obtaining the next rectangular screen coordinates which may occur in the future. If there are rectangular screen coordinates stored, then they are sent to be processed and added to the other changed rectangular screen coordinates list 23 in the order that they occurred. Once a collection of the rectangular screen coordinates has been generated in the rectangular screen coordinates list 23, they are then passed through a sort 24 of the rectangular screen coordinates occurs to determine changes and to determine if there are changes with overlapping regions. If only rectangular screen coordinate changes have occurred with no overlaps then a call 25 is made using the rectangular screen coordinates to capture screen data from the monitored station using rectangular screen coordinates in the rectangular screen coordinates list 23 which are updated and sent 26 compressed to a supervisor station to show the changes. However, if rectangular screen coordinates changes have occurred and those changes have generated overlapping rectangular screen coordinates, then they are passed to the overlapping regions process 27 for elimination of the over laps as has been simply described in FIGS. 1,2,3,4, and 5 and which process will be described in more detail hereafter.

Figure 7:
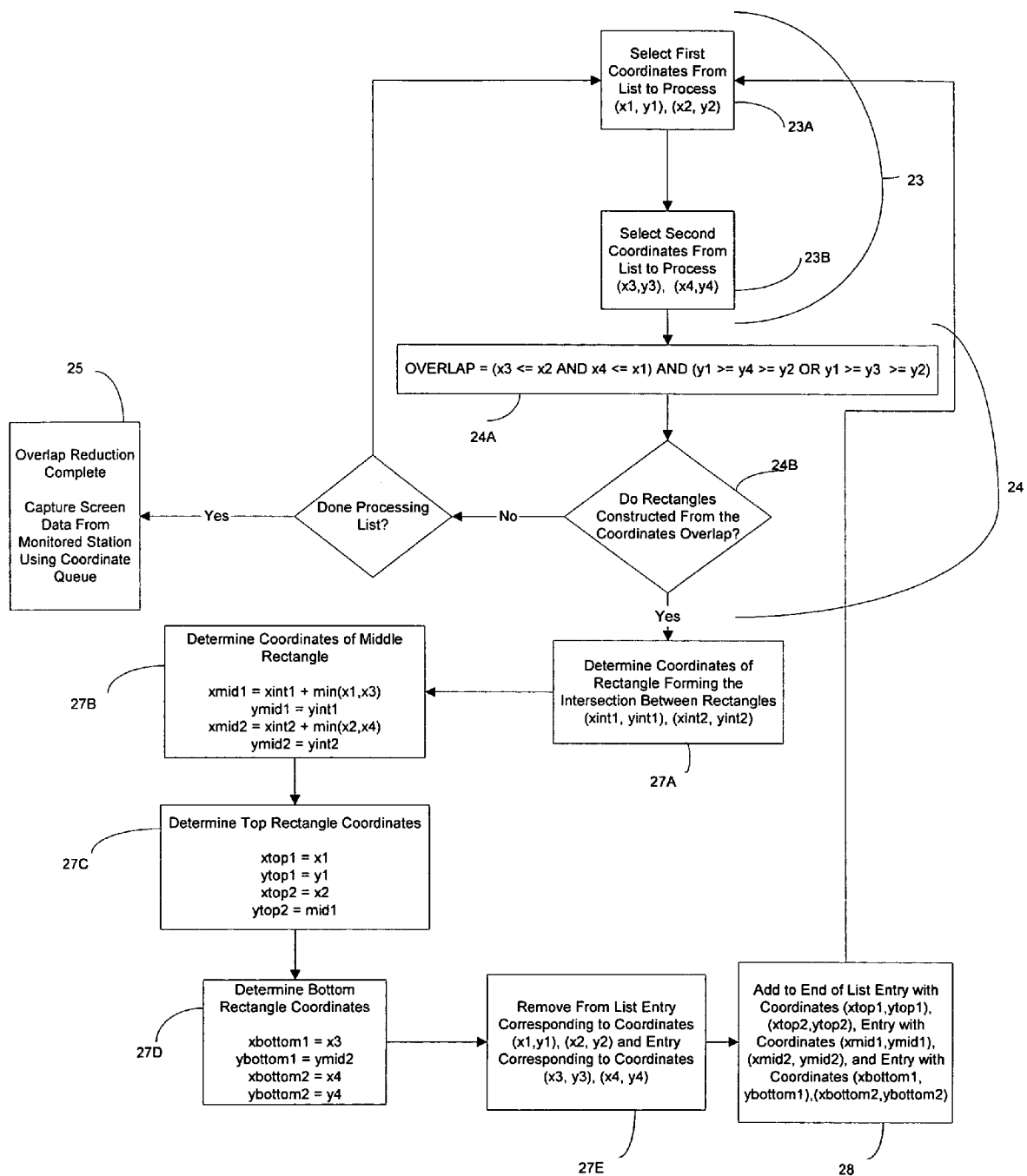
FIG. 7 represents a more detailed diagrammatic outline of the methods used to Eliminate Overlapping Regions as set out in FIG. 6.

Referring now to FIG. 7 for a more detailed explanation of one embodiment of this invention, which will also be tied back to FIG. 6 to amplify the processing steps shown in FIG. 6, the first steps in FIG. 7, 23A and 23B, correspond to the rectangular screen coordinates list 23 of FIG. 6. Therefore the collection of rectangular screen coordinates into the rectangular screen coordinates list 23, as indicated in FIG. 6, is composed of two step in FIG. 7. The first step 23A is selecting a first set of rectangular screen coordinates from the rectangular screen coordinates list 23 and at least a second step 23B of selecting a second set of rectangular screen coordinates from the rectangular screen coordinates list 23. Once the steps 23A and 23B of selecting a set of rectangular screen coordinates has occurred, then the process is passed to a sort 24, as shown in FIG. 6, but as shown in FIG. 7 this step is composed of the process of analyzing the overlapped at 24 A and determining at step 24 B whether there is an overlapping relationship of these rectangular screen coordinates. If there is determined to be no overlapping relationship, the rectangular screen coordinates are passed to process step 25, as shown in both FIG. 6 and FIG. 7, where these rectangular screen coordinates are used to make one call to obtain window graphics from the agent's computer for display to a supervisor's computer station and screen. It is generally beneficial to compress a window graphics send for ease of handling, as those skilled in the art will appreciate.

After steps 23A and 23B of selecting a set of rectangular screen coordinates has occurred, they are then passed to the process of analyzing the overlapped rectangular screen coordinates at 24A and 24B to determine whether there is an overlapping relationship, as shown in FIG. 7. If there is determined to be an over lapping relationship the rectangular screen coordinates are passed to a process step 27 A to determine the intersection coordinates between the rectangular screen coordinates for resolution in to coordinates (xint1,yint1) and (xint2, yint2) which was shown in FIG. 2 and at 27A of FIG. 7. After this process step is completed the identified collection of resolved coordinates are used and passed to step 27 B, 27 C, and 27 D for the creation of new rectangular screen coordinates from the overlapped rectangular screen coordinates to create new rectangular screen coordinates and for any portion of the rectangular screen coordinates changed but not necessarily just in the over lapped relationship, as the FIG. 1 and FIG. 2 would show. After these new coordinates are created the old rectangular screen coordinates are removed as shown in FIG. 27E. and the new rectangular screen coordinates are sent through 28 and added back to the coordinates list 23, and processed as a new set of rectangular screen coordinates to see if there is any overlapping from other rectangular screen coordinates in the queue. The process of comparing and creating new rectangular screen coordinates changed is continued until no overlapped rectangular screen coordinates occurs. Once there are no more overlapped rectangular screen coordinates the new rectangular screen coordinate are sent to process step 25 and with one call obtains the window graphics as previously explained in step 25. As those skilled in the art will appreciate, the computational load from doing a routine with (x,y) coordinates is relatively light compared to doing windows graphic call, so this invention reduces the computational load as screen changes occur and only send the window graphic calls based on the rectangular screen coordinates which are resolved to have changed which greatly enhances the updating capacity of the computer and monitor being used to monitor an agent's workstation.

Figure 8:
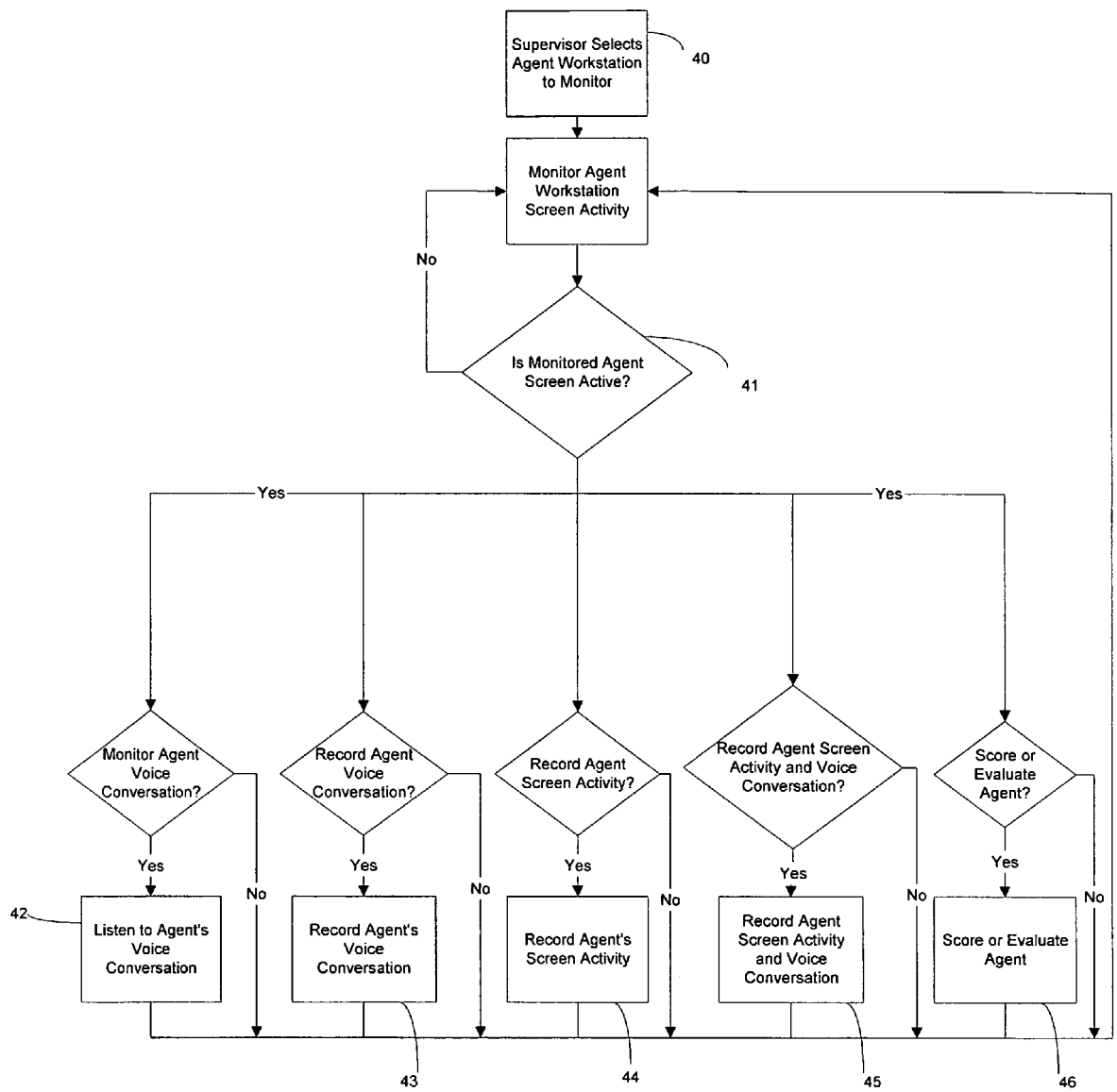
FIG. 8 is a general diagrammatic over view of options available to a supervisor on his screen after selecting an agent's workstation to monitor.

This invention further includes the ability, in conjunction with the screen monitoring to pick up and pass through the voice communications both in analog and digital formats to the supervisor once he has selected the agent's workstation he choices to monitor. This is achieved from the supervisor's computer screen along with other options this invention has incorporated and as will be explained in FIG. 8. Referring now to FIG. 8, the supervisor's first step is as shown diagrammatically selecting an agent's workstation to monitor 40. While the improvements of this invention give a supervisor the ability to simultaneously monitor more than one agent's screen at a time, in order to invoke the other options, the supervisor needs to select an agent to monitor. Therefore, once selected, the agent workstation screen activity becomes active 41, which then opens up the supervisor's full range of options. Those options include the option of monitoring the agent's voice communication 42 and/or simultaneously recording the agent's voice or not monitoring the agent's voice and just recording the agent's voice 43. This invention further makes the recording of screen activity 44 available by itself or provides in combination the recording both the screen activity 44 and voice and screen activity 45. Simultaneously, another valuable option is available once the agents screen has been selected and activated and that is the ability to rate and score an agent's performance 46 based on preselected criteria which pop up on the supervisor's screen while the supervisor is monitoring any of the above listed options or combinations thereof.

While preferred embodiments of this invention have been described in specific details with references to specific disclosures and embodiments, it will be understood that there are many variations and modifications which may be used and still be within the spirit and scope of this invention as described in the attached claims.

We claim:

1. A method for rapid and simplified remote monitoring on screen activity of a computer work station with voice capabilities from another computer with voice capabilities and a monitor with both of said computers having their own operating systems and said computer to be monitored has loaded and is running a shared library loaded into memory comprising,
    a. Obtaining rectangular screen coordinates changed in a window,
    b. Storing said changed rectangular screen coordinates obtained,
    c. Processing overlapped rectangular screen coordinates changed in a window before sending said obtained window graphic to another computer,
    d. Polling said stored obtained changed rectangular screen coordinates at predetermined time sequences,
    e. Obtaining window graphics using said stored changed rectangular screen coordinates at said predetermine time sequences polled,
    f. Sending said processed overlapped rectangular screen coordinates changed for a window region once to said other computer with said obtained window graphics for said processed overlapped rectangular screen coordinates,
    g. Updating said another computer screen with said obtained window graphics which are the regions changed therein for rapid and simple updating of monitor changes on said monitor being monitored.

2. The method of claim 1 further comprising;
    a. Using one call from said processed overlapped rectangular screen coordinates changed to obtain window graphics for display to said another computer.

3. The method of claim 2 wherein said processing of overlapped rectangular screen coordinates changed further comprises;
    a. Comparing rectangular screen coordinates changed in a window for overlapping coordinates; and
    b. Creating new rectangular screen coordinates from said overlapped rectangular screen coordinates changed in a window.

4. The method of claim 3 wherein said creating new rectangular screen coordinates from said overlapped rectangular screen coordinates changed in a window further comprises;
    a. Creating new rectangular screen coordinates from said overlapped rectangular screen coordinates changed in a window where said one set of overlapping rectangular screen coordinates is encompassed by said other set of overlapping rectangular screen coordinate, and
    b. Creating new rectangular screen coordinates from said overlapped rectangular screen coordinates changed in a window and for any portion of said rectangular screen coordinates changed but not overlapped.

5. The method of claim 4 further comprising;
    a. Continuing to compare rectangular screen coordinates changed in a window for overlapping coordinates;
    b. Creating new rectangular screen coordinates from said overlapped rectangular screen coordinates changed in a window until no over lap coordinates exist; and
    c. Sending said new rectangular screen coordinates with one call to obtain window graphics for display to said another computer within said new rectangular screen coordinates.

6. The method of claim 5 further comprising;
    a. Obtaining rectangular command prompt coordinates changed from operating system,
    b. Storing said changed rectangular command prompt coordinates obtained from said operating system,
    c. Polling said stored obtained changed rectangular command prompt coordinates at predetermined time sequences,
    d. Sending changed rectangular command prompt coordinates stored to another computer and
    e. Updating said another computer screen with said obtained changed rectangular command prompt coordinates for rapid and simple updating of monitor command changes on said monitor being monitored.

7. The method of claim 6 further comprising;
    a. Monitoring at least one or more monitors used as computer work stations from said another computer;
    b. Selecting said at least one work station monitor to monitor;
    c. Connecting said voice monitoring of said selected work station monitor to pick up said voice and screen monitoring for simultaneous monitoring of voice and screen changes on said another computer and monitor.

8. The method of claim 7 further comprising;
    a. Activating a recording function to digitize and record said voice monitoring of said selected work station monitor to record said voice communications.

9. The method of claim 7 further comprising;
    a. Connecting by voice over internet protocol said voice monitoring of said selected work station monitor to pick up said voice and screen monitoring for simultaneous transmission of monitoring of voice and screen changes on said another computer and monitor.

10. The method of claim 9 further comprising:
    a. Activating a recording function to record said voice monitoring and said screen monitoring for play back.

11. The method of claim 8 further comprising;
    a. Evaluating an agent at said computer work station;
    b. Recording said evaluation in pre-selected categories; and
    c. Creating an overall evaluation of said agent.

* * * * *